US006930691B2

(12) United States Patent
Lebowsky et al.

(10) Patent No.: US 6,930,691 B2
(45) Date of Patent: Aug. 16, 2005

(54) COLOR TRANSFORMATION IN 3D COLOR SPACE

(75) Inventors: Fritz Lebowsky, St. Martin d'Uriage (FR); Charles F. Neugebauer, Los Altos, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/788,238

(22) Filed: Feb. 26, 2004

(65) Prior Publication Data

US 2004/0233214 A1 Nov. 25, 2004

Related U.S. Application Data

(63) Continuation-in-part of application No. 10/014,332, filed on Dec. 11, 2001.

(51) Int. Cl.$^7$ ................................................. G09G 5/02
(52) U.S. Cl. ........................................................ 345/597
(58) Field of Search .................... 345/589–97; 382/162, 382/167; 358/518, 1.9

(56) References Cited

U.S. PATENT DOCUMENTS 5,428,465 A * 6/1995 Kanamori et al. .......... 358/518

OTHER PUBLICATIONS

Sugiura, H., Kagawa, S., Takahashi, M., and Matoba, N., "Development of New Color Conversion System," pp. 278–289, Proceedings of SPIE vol. 4300 (2001).

Chosson, S.M., and Hersch, R.D., "Visually–Based Color Space Tetrahedrizations for Printing With Custom Inks," pp. 81–91, Proceedings of SPIE vol. 4300 (2001).

* cited by examiner

*Primary Examiner*—Kee M. Tung
*Assistant Examiner*—Anthony Blackman
(74) *Attorney, Agent, or Firm*—Stephen C. Bongini; Lisa K. Jorgenson (57) ABSTRACT

A method, system and computer readable medium for transforming three dimensional (3D) color information into a color standard is described. A 3D cube defined by eight RGB color points representing the eight vertices of the 3D cube is stored. Each of the eight points represents one of the colors: red, yellow, white, magenta, blue, black, green and cyan. In addition, each of the eight points represents the difference between the capacity of a display and the color standard. The 3D cube is divided into six tetrahedrons and the tetrahedron corresponding to an input RGB pixel is selected. A 3×3 matrix based on the vertices of the selected tetrahedron is calculated. The 3×3 matrix is then multiplied by the components of the input RGB pixel to produce an output RGB pixel conforming to the color standard.

22 Claims, 7 Drawing Sheets

COLOR TRANSFORMATION IN 3D COLOR SPACE

CROSS REFERENCE TO RELATED APPLICATIONS

This is a continuation-in-part of a non-provisional patent application Ser. No. 10/014,332 filed Dec. 11, 2001 now [Pending], for "Color Transformation in 3D Color Space", which is commonly assigned herewith to STMicroelectronics, Inc., and incorporated hereinto in its entirety by reference.

BACKGROUND OF THE INVENTION

1. Field of the Invention

The present invention relates to the field of computer graphics and, more specifically, to the field of color transformation.

2. Description of Related Art

In recent years, the types of devices available for viewing images has increased dramatically. Consumers view images on several different output devices such as monitors, displays, televisions, cameras, printers, and other electronic devices. Whereas the Cathode Ray Tube (CRT) used to be the standard device for viewing images, today a user can also purchase a Liquid Crystal Display (LCD) or a Plasma Display Panel (PDP). The increasing variety of available devices, however, has produced a problem of color uniformity. Because of the mechanical differences between the different types of devices, colors are often displayed in different ways. That is, a CRT many times displays the color red differently than an LCD. Moreover, a picture displayed on an LCD prints with different color uniformity on a printer.

The disparity between the manner in which different devices display colors has led to a uniform color standard. Examples of uniform color standards that have gained popularity are the sRGB color standard and the CIE color standard. These color standards define color points to which all participating devices must conform. In order to conform to a default color space, a device must perform a transform on the color that it desires to display. That is, as a device prepares to display a color, it must first transform the color to the default color space before the device displays the desired color. Current color transformation techniques, however, do not come without drawbacks.

One color transformation technique involves the use of a 3D lookup table (3D LUT). This technique uses a table defining a corresponding output color for each input color. The 3D LUT technique, however, requires vast amounts of memory to store the entire table. In addition, the initial creation of the table can take a long period of time.

Another color transformation technique involves the use of matrix calculation. This technique uses a matrix function that is applied to an input color to produce an output color. The matrix calculation technique, however, reduces the gamut of colors that can be produced by the output device. In addition, this technique transforms the input color into another color space before transforming the input color into the default color space. This is computationally intensive and time-consuming.

Accordingly, there exists a need to overcome these drawbacks with current color transformations and to provide color transform to a default color space.

SUMMARY OF THE INVENTION

A method, system and computer readable medium for transforming three dimensional (3D) color information into a color standard is described. In an embodiment of the present invention, a 3D cube defined by eight RGB color points representing the eight vertices of the 3D cube is stored. Each of the eight points represents one of the colors: red, yellow, white, magenta, blue, black, green and cyan. In addition, each of the eight points represents the difference between the capacity of a display and the color standard. The 3D cube is divided into six tetrahedrons and the tetrahedron corresponding to an input RGB pixel is selected. A 3×3 matrix based on the vertices of the selected tetrahedron is calculated. The 3×3 matrix is then multiplied by the components of the input RGB pixel to produce an output RGB pixel conforming to the color standard.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION OF PREFERRED EMBODIMENTS

1. Overview of the System

The present invention is described in terms of the exemplary embodiments below. This is for convenience only and is not intended to limit the application of the present invention. In fact, after reading the following description, it will be apparent to one of ordinary skill in the relevant art(s) how to implement the present invention in alternative embodiments.

Figure 1:
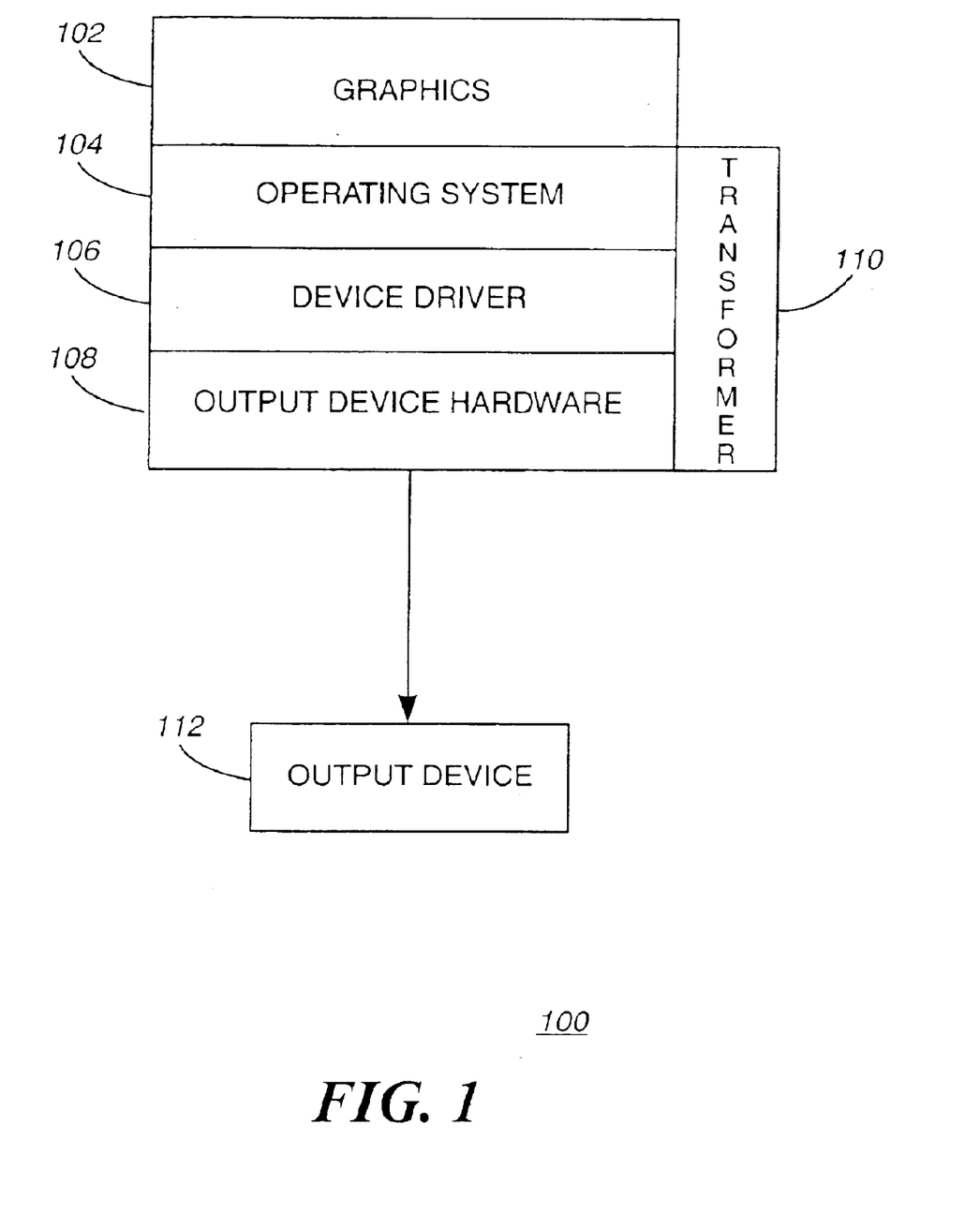
FIG. 1 is a block diagram illustrating the overall system architecture of an embodiment of the present invention.

FIG. 1 is a block diagram illustrating the overall system 100 architecture of an embodiment of the present invention. FIG. 1 shows graphics 102, an Operating System (OS) 104, a device driver 106, output device hardware 108, a transformer 110 and an output device 112. Graphics 102 are any images that can be shown on output device 112. Graphics 102 are produced by a computer application program such as a video game, a broadcaster such as a television station, or any other entity capable of producing an image and providing it to system 100 via a communications path.

System 100 is a system for displaying graphics 102 on output device 112. In an embodiment of the present invention, system 100 is a television or monitor for processing images that are received via a radio frequency, a satellite transmission, cable, telephone, Ethernet or any other communications path. In another embodiment of the present invention, system 100 is a personal computer (PC) (e.g., an IBM or compatible PC workstation running the Microsoft Windows 95/98/2000/CE/NT/XP operating system, a Macintosh computer running the Mac OS operating system, or a SUN workstation running the UNIX operating system), a Personal Digital Assistant (PDA) (e.g., a PalmPilot running the Palm OS operating system), a game console (e.g., a Microsoft Xbox console or a Sony Playstation 2 console) or interactive television. In another embodiment of the present invention, system 100 is a camcorder (e.g., a Sony MiniDV camcorder) or a mobile phone capable of displaying color images.

OS 104 is the operating system for system 100, i.e., the low-level software which handles the interface to peripheral hardware, schedules tasks, allocates storage, and presents a default interface to the user when no computer application program is running. In an embodiment of the present invention, OS 104 is the Microsoft Windows 95/98/2000/CE/NT/XP operating system, the Macintosh operating system, the UNIX operating system, the LINUX operating system or any other software capable of performing the tasks of an operating system. OS 104 is implemented in hardware, software or any combination of the two.

Output device 112 is any device capable of displaying a color image. In an embodiment of the present invention, output device 112 is a television set, a computer monitor, a laptop display, a DVD player display, a PDA display, a camcorder display, a mobile phone display or a printer. In the event that output device 112 is a video display unit, output device 112 is a Cathode Ray Tube (CRT), a Liquid Crystal Display (LCD), a plasma display, an organic Light Emitting Device (LED) or any other electrical, optical, biological, chemical or mechanical device capable of displaying a color image. While only one output device 112 is shown in FIG. 1 for ease of explanation, the system 100 may support any number of output devices 112.

Output device hardware 108 is any hardware used in conjunction with output device 112 for displaying images. Output device hardware 108 includes such hardware units as a graphics card (such as an Nvidia GeForce II graphics card), a graphics controller located within a CRT, or a printer controller. Device driver 106 is the unit capable of controlling, or driving, the output device hardware 108. Device driver 106 provides a level of abstraction between the output device hardware 108 and the OS 104. As such, device driver 106 allows higher level OS calls to interact with functions and elements specific to output device hardware 108. Device driver 106 is implemented in hardware, software or any combination of the two.

Transformer 110 represents the substantive functions of the present invention. Transformer 110 performs the transformation of an input RGB pixel into an output RGB pixel conforming to the standard color space. The functions performed by transformer 110 are described in greater detail below. Transformer 110 is implemented in hardware, software or any combination of the two. In an embodiment of the present invention, transformer 110 resides in OS 104, device driver 106, any element of output device hardware 108 or any combination of the above. In another embodiment of the present invention, transformer 110 is a separate entity that interacts with OS 104, device driver 106, any element of output device hardware 108 or any combination of the above.

Figure 2:
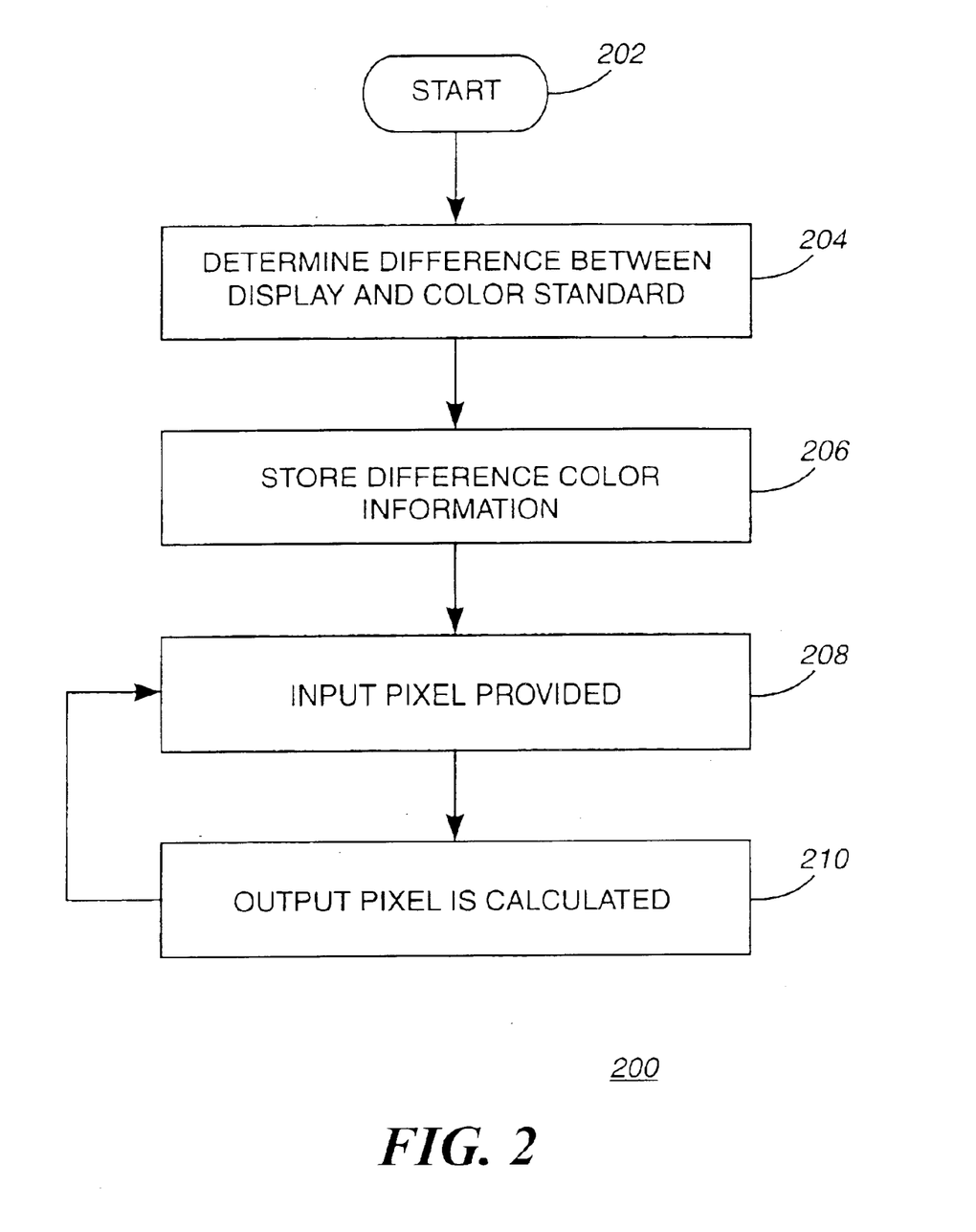
FIG. 2 is a flowchart depicting the overall operation and control flow of one embodiment of the present invention.
Figure 3:
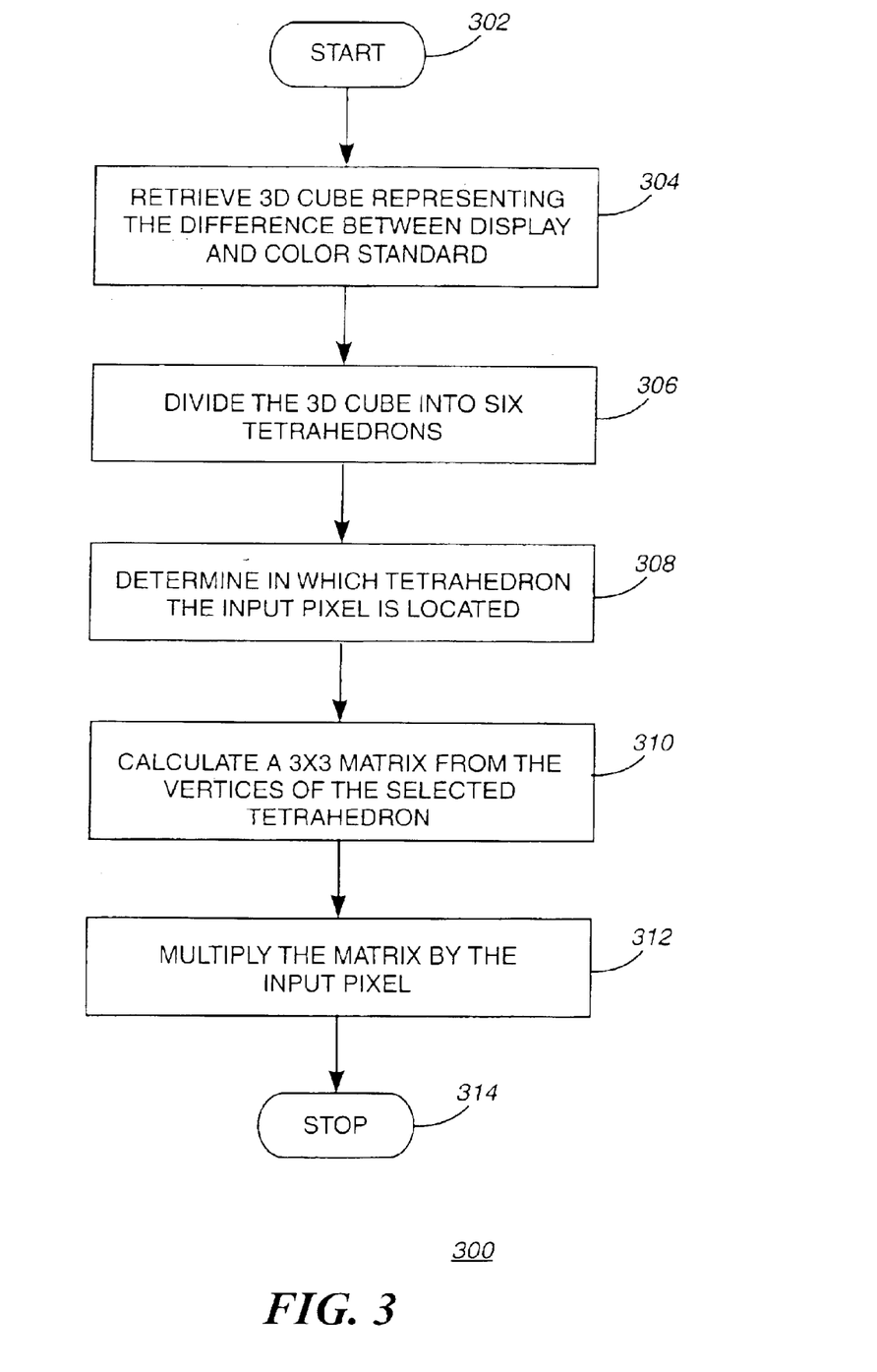
FIG. 3 is a flowchart depicting the operation and control flow of the transformation process, in one embodiment of the present invention.

More detailed descriptions of system 100 components, as well as their functionality and inter-functionality with other system 100 components, are provided below. The operation system 100 of FIG. 1 according to one embodiment of the present invention is shown in the flowcharts of FIGS. 2 and 3.

2. Color Spaces

As is commonly known in the art, the RGB color space represents a closed set of colors defined by RGB color points. The RGB color space is a system of defining colors by their Red, Green and Blue components. Thus, every color in the RGB color space is defined by three values—the Red component, the Green component and the Blue component. For example, the RGB color point X is defined by an RGB triplet denoted as:

$$X=(\text{RedX, GreenX, BlueX}) \quad (\text{EQ:1})$$

where RedX is the red component of point X, GreenX is the green component of point X and BlueX is the blue component of point X.

Figure 4:
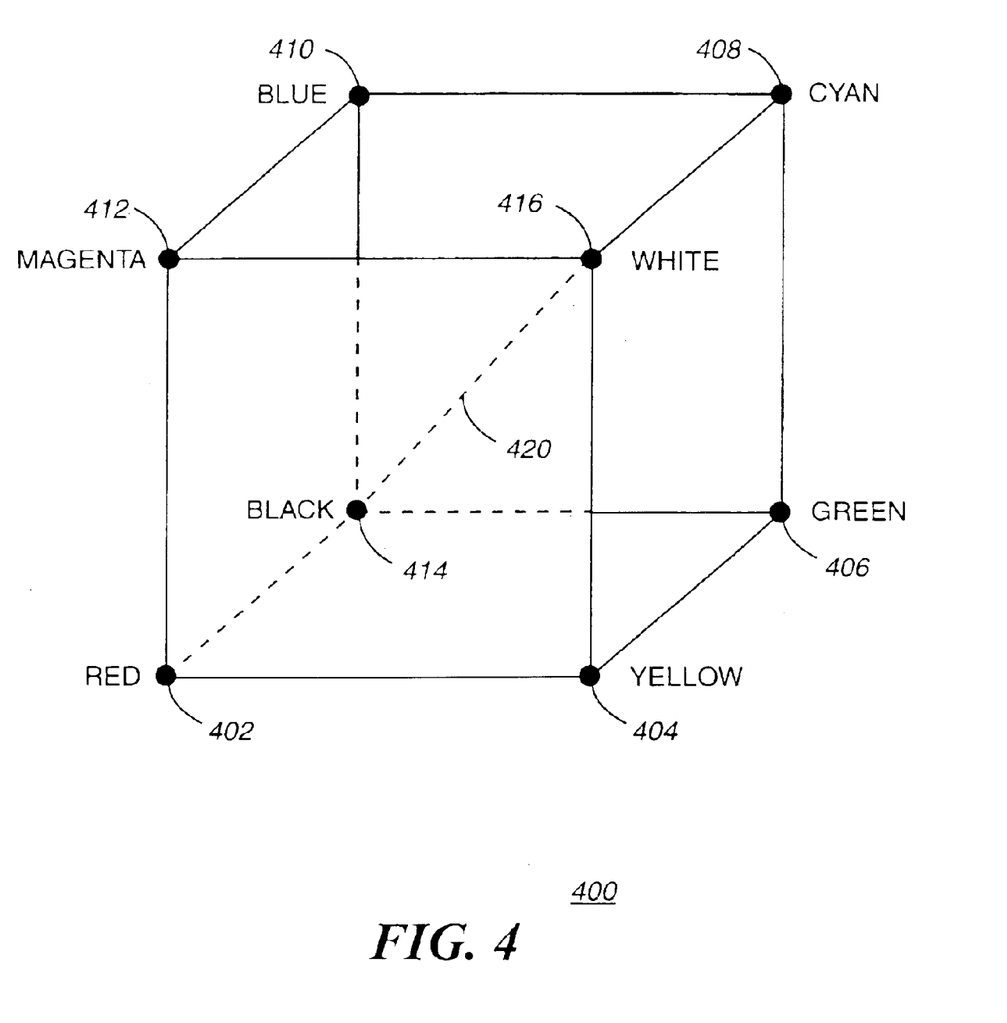
FIG. 4 is an illustration of a three dimensional cube representing a color space, in one embodiment of the present invention.

The RGB color space system lends itself to be conceptualized in three dimensions (3D). This is because of the use of three coordinates (i.e., an RGB triplet) to define each RGB color point in the RBG color space system. This concept is shown in FIG. 4. FIG. 4 is an illustration of a 3D cube 400 representing the RGB color space, in one embodiment of the present invention. FIG. 4 shows the eight color points generally known in the art to represent the boundaries of the RGB color space. Each of the eight color points defines a limit vertex of the 3D cube 400 representing the RGB color space. The vertices of the 3D cube 400 are denoted as "limit vertices" because these vertices define the boundaries, or limits, of the color space. Heretofore, limit vertices are referred to as "vertices." 3D cube 400 has as its vertices: red vertex 402, yellow vertex 404, white vertex 416, magenta vertex 412, black vertex 414, green vertex 406, cyan vertex 408 and the blue vertex 410. Each vertex is, in turn, defined by three color components. The eight RGB color points defining the vertices of the 3D cube 400 are defined below by RGB triplets:

Black vertex=(BlackR, BlackG, BlackB)

White vertex=(WhiteR, WhiteG, WhiteB)

Yellow vertex=(YellowR, YellowG, YellowB)

Red vertex=(RedR, RedG, RedB)

Green vertex=(GreenR, GreenG, GreenB)

Blue vertex=(BlueR, BlueG, BlueB)

Cyan vertex=(CyanR, CyanG, CyanB)

Magenta vertex=(MagentaR, MagentaG, MagentaB)   (EQ:2)

3. Operation of the System

FIG. 2 is a flowchart depicting the overall operation and control flow 200 of one embodiment of the present invention. Flow 200 describes generally the functions performed by transformer 110 in FIG. 1. Control flow 200 begins with step 202 and flows directly to step 204.

In step 204, the difference, or delta, between the capacity of the output device and the color standard is determined.

This step requires testing to be performed on the output device 112. Typically, the testing consists of producing certain test color points on the output device 112 and measuring the color of the test color points with a device such as a colorimeter. These measurements are then compared to control measurements. A control measurement is a measurement that is taken from a color-standard-conforming output device displaying the same color point. For each test color point, a difference, or delta, is calculated between the measurements taken from the output device 112 and the control measurement. More specifically, for each RGB component of a test color point, a delta is calculated between the measurements taken from the output device 112 and the control measurement. Thus, the result of the testing is a set of eight color point deltas, with each color point delta consisting of three components—a Red component, a Green component and a Blue component.

In an embodiment of the present invention, a delta measurement is taken for each of the following test color points: red, yellow, white, magenta, blue, black, green and cyan. Specifically, a delta measurement is taken for each component of each test color point—a Red component, a Green component and a Blue component. In an embodiment of the present invention, the delta measurements for each of the eight test color points are then combined to define the vertices of a 3D cube representing a color space symbolizing the delta between the capacity of the output device and the color standard. Heretofore, this 3D cube will be referred to as the "delta 3D cube." In an embodiment of the present invention, the eight RGB points defining the vertices of the delta 3D cube are defined by RGB triplets as shown in equations (2). The manner in which eight color points define the vertices of a 3D cube representing a color space is defined in greater detail in FIG. 4 above.

In step 206, the delta measurements (i.e., the delta 3D cube) calculated in step 204 above are stored. The delta measurements are later used by the transformer 110 when transforming RGB input pixels to output RGB pixels conforming to the color standard.

In step 208, an input RGB pixel is provided to transformer 110. The input RGB pixel is defined by the following RGB triplet:

$$\text{Input RGB pixel}=(\text{InR, InG, InB}) \quad\quad (EQ:3)$$

In step 210, an output pixel conforming to the color standard and corresponding to the input pixel is calculated in a transformation process. The output RGB pixel is defined by the following RGB triplet:

$$\text{Output RGB pixel}=(\text{OutR, OutG, OutB}) \quad\quad (EQ:4)$$

Step 210 and the transformation process are described in greater detail in FIG. 3 below. Control flows back to step 208 as input pixels are received and output pixels are calculated continuously by transformer 110.

In an embodiment of the present invention, steps 204 and 206 are not performed by transformer 110. In this embodiment, the delta measurements are taken by a third party and stored in transformer 110 or in any other location to which transformer 110 has access. Transformer 110 does not participate in the process of testing the output device 112 and simply uses the results of the testing, i.e., the delta measurements. In this embodiment, steps 204 and 206 are performed by a third party and control flows directly from step 202 to step 208.

4. The Transformation Process

FIG. 3 is a flowchart depicting the operation and control flow of the transformation process, in one embodiment of the present invention. Flow 300 describes generally the transformation process performed by transformer 110 in step 210 of FIG. 2. Control flow 300 begins with step 302 and flows directly to step 304.

In step 304, the delta measurements calculated and stored in steps 204 and 206 of FIG. 2 above are retrieved by transformer 110. Specifically, transformer 110 retrieves eight RGB color points defining the vertices of a delta 3D cube representing a color space symbolizing the differences between the capacity of the output device and the color standard. An example of the eight RGB color points retrieved by transformer 110 is shown in equations (2) above.

In step 306, the delta 3D cube represented by the eight retrieved RGB color points is divided into six equal tetrahedrons. A tetrahedron is a 3D shape defined by four points in 3D, where all of the points are not coplanar. In step 306, the delta 3D cube is divided into six tetrahedrons such that the following three conditions are met: I) all tetrahedrons are equal; II) each of the six tetrahedrons are defined by four vertices of the 3D cube; and III) all tetrahedrons share the black-to-white edge. The division of a 3D cube into six equal tetrahedrons in this fashion is described in greater detail below.

Figure 5:
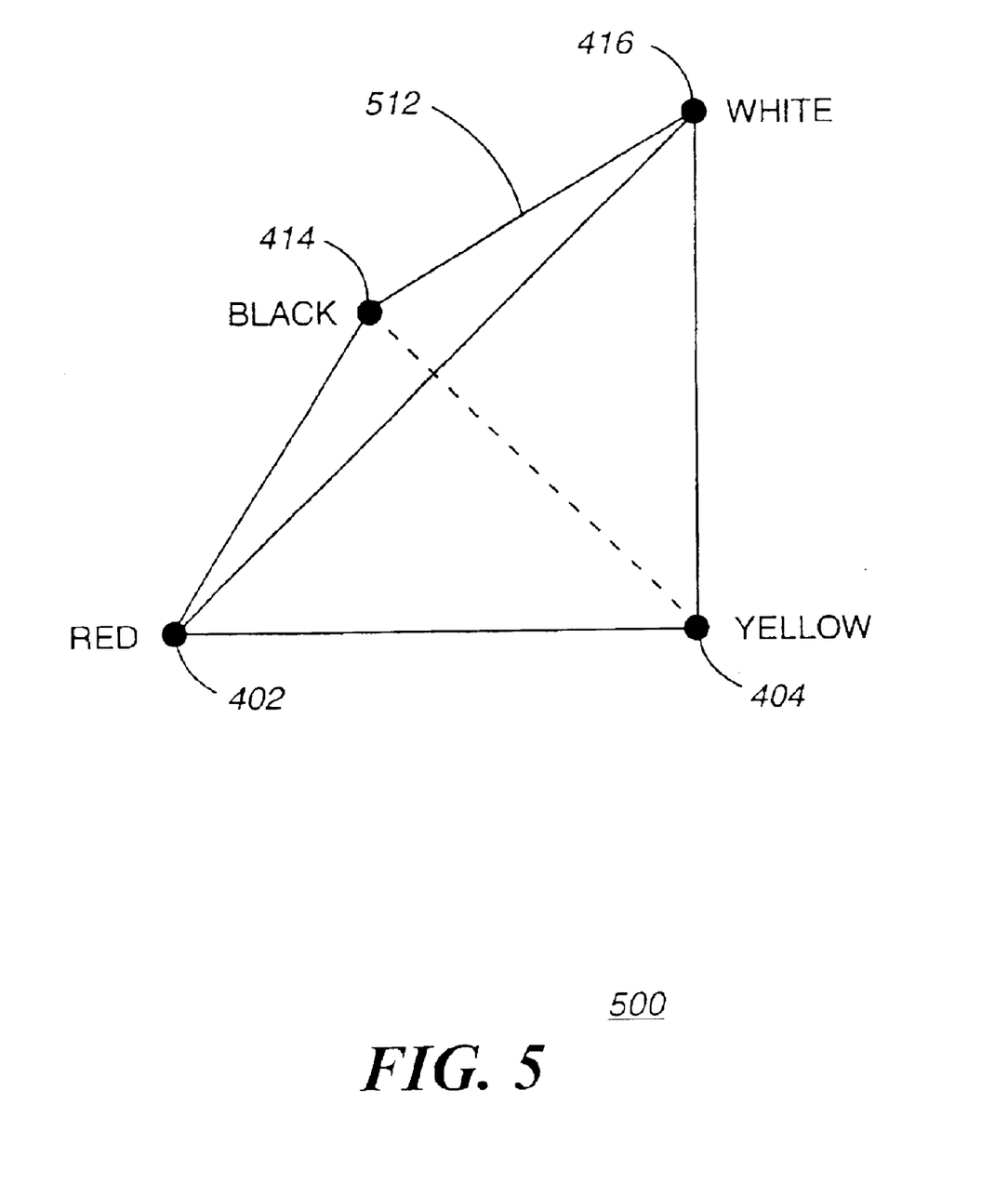
FIG. 5 is an illustration of one of six equal tetrahedrons within the three dimensional cube of FIG. 4, in one embodiment of the present invention.

FIG. 5 is an illustration of one of the six equal tetrahedrons within the 3D cube 400 shown in FIG. 4, in one embodiment of the present invention. Tetrahedron 500 shows that condition II is met because all of its vertices are vertices of the 3D cube 400. Tetrahedron 500 has the following vertices: red vertex 402, white vertex 416, yellow vertex 404 and black vertex 414. Tetrahedron 500 also shows that condition III is met because the black-to-white edge 420 is an edge of the tetrahedron. The remaining five tetrahedrons within 3D cube 400 are defined in the same fashion. The six equal tetrahedrons within 3D cube 400 are defined below by their vertices:

Tetrahedron 1: (Red 402, Yellow 404, Black 414, White 416);

Tetrahedron 2: (Red 402, Magenta 412, Black 414, White 416);

Tetrahedron 3: (Green 406, Yellow 404, Black 414, White 416);

Tetrahedron 4: (Green 406, Cyan 408, Black 414, White 416);

Tetrahedron 5: (Blue 410, Magenta 412, Black 414, White 416);

Tetrahedron 6: (Blue 410, Cyan 408, Black 414, White 416)(EQ:5)

In an embodiment of step 306, the delta 3D cube represented by the eight retrieved RGB color points is divided into six tetrahedrons which are not necessarily equal. In this embodiment, the delta 3D cube is divided into six tetrahedrons such that only one condition is met: every point within the 3D cube is located within only one tetrahedron.

In step 308, transformer 110 determines which of the six equal tetrahedrons within the delta 3D cube (as defined in step 306) corresponds to the input RGB pixel provided in step 208 of FIG. 2 above. In one embodiment of the present invention, the tetrahedron corresponding to the input RGB pixel is the tetrahedron in which the input RGB pixel is located according to 3D cube 400 of FIG. 4. That is, if the 3D cube 400 were divided into six equal tetrahedrons as described above, the tetrahedron corresponding to the input RGB pixel is the tetrahedron within which the coordinates of the input RGB pixel lie. In an embodiment of the present invention, the following inequalities define in which tetrahedron (of the delta 3D cube) the input RGB pixel is located, based on the coordinates of the input RGB pixel (defined in equation (3)):

Tetrahedron 1: $InR \geq InG; InR \geq InB; InG \geq InB$

Tetrahedron 2: $InR \geq InG; InR \geq InB; InG \leq InB$

Tetrahedron 3: $InR \leq InG; InR \geq InB; InG \geq InB$

Tetrahedron 4: $InR \leq InG; InR \geq InB; InG \geq InB$

Tetrahedron 5: $InR \geq InG; InR \leq InB; InG \leq InB$

Tetrahedron 6: $InR \leq InG; InR \leq InB; InG \leq InB$     (EQ:6)

In step 310, a 3×3 matrix is calculated based on the vertices of the tetrahedron (within the delta 3D cube) that corresponds to the input RGB pixel. In an embodiment of the present invention, the coefficients of the first row of the 3×3 matrix are based on a first edge of the tetrahedron, the coefficients of the second row of the 3×3 matrix are based on a second edge of the tetrahedron and the coefficients of the third row of the 3×3 matrix are based on a third edge of the tetrahedron. Further, none of the coefficients of the 3×3 matrix are based on the black-to-white-edge 420 of the tetrahedron.

In an embodiment of the present invention, the coefficients of the 3×3 matrix are based on the vertices of the delta 3D cube, as defined by equations (2). For each tetrahedron in the delta 3D cube, the coefficients of the 3×3 matrix are calculated as shown below:

(EQ:7)

Tetrahedron 1:
$x_1$=RedR−BlackR; $y_1$=RedG−BlackG; $z_1$=RedB−BlackB
$x_2$=YellowR−RedR; $y_2$=YellowG−RedG; $z_2$=YellowB−RedB
$x_3$=WhiteR−YellowR; $y_3$=WhiteG−YellowG; $z_3$=WhiteB−YellowB Tetrahedron 2:
$x_1$=RedR−BlackR; $y_1$=RedG−BlackG; $z_1$=RedB−BlackB
$x_2$=WhiteR−MagentaR; $y_2$=WhiteG−MagentaG; $z_2$=WhiteB−MagentaB
$x_3$=MagentaR−RedR; $y_3$=MagentaG−RedG; $z_3$=MagentaB−RedB Tetrahedron 3:
$x_1$=YellowR−GreenR; $y_1$=YellowG−GreenG; $z_1$=YellowB−GreenB
$x_2$=GreenR−BlackR; $y_2$=GreenG−BlackG; $z_2$=GreenB−BlackB
$x_3$=WhiteR−YellowR; $y_3$=WhiteG−YellowG; $z_3$=WhiteB−YellowB Tetrahedron 4:
$x_1$=WhiteR−CyanR; $y_1$=WhiteG−CyanG; $z_1$=WhiteB−CyanB
$x_2$=GreenR−BlackR; $y_2$=GreenG−BlackG; $z_2$=GreenB−BlackB
$x_3$=CyanR−GreenR; $y_3$=CyanG−GreenG; $z_3$=CyanB−GreenB Tetrahedron 5:
$xx$=MagentaR−BlueR; $y_1$=MagentaG−BlueG; $z_1$=MagentaB−BlueB
$x_2$=WhiteR−MagentaR; $y_2$=WhiteG−MagentaG; $z_2$=WhiteB−MagentaB
$x_3$=BlueR−BlackR; $y_3$=BlueG−BlackG; $z_3$=BlueB−BlackB Tetrahedron 6:
$x_1$=WhiteR−CyanR; $y_1$=WhiteG−CyanG; $z_1$=WhiteB−CyanB
$x_2$=CyanR−BlueR; $y_2$=CyanG−BlueG; $z_2$=CyanB−BlueB
$x_3$=BlueR−BlackR; $y_3$=BlueG−BlackG; $z_3$=BlueB−BlackB where $x_1$, $y_1$, and $z_1$ are the coefficients of the first row of the 3×3 matrix, where $x_2$, $y_2$, and $z_2$ are the coefficients of the second row of the 3×3 matrix, and where $x_3$, $y_3$, and $z_3$ are the coefficients of the third row of the 3×3 matrix. The resulting 3×3 matrix is shown below:

$$\begin{pmatrix} x_1 & y_1 & z_1 \\ x_2 & y_2 & z_2 \\ x_3 & y_3 & z_3 \end{pmatrix} \quad (EQ: 8)$$

In step 312, the 3×3 matrix calculated in step 310 above is multiplied by the input RGB pixel (defined in equation (3) above). This step is shown below:

$$\begin{pmatrix} x_1 & y_1 & z_1 \\ x_2 & y_2 & z_2 \\ x_3 & y_3 & z_3 \end{pmatrix} \begin{pmatrix} InR \\ InG \\ InB \end{pmatrix} \quad (EQ: 9)$$

As explained above, the result of flow 300 is an output RGB pixel defined in equation (4) above. The result of the multiplying step 312 is three components, wherein each component represents a component of the output RGB pixel. This result is shown below:

$OutR = InR\ x_1 + InG\ y_1 + InB\ z_1$ $OutG = InR\ x_2 + InG\ y_2 + InB\ z_2$ $OutB = InR\ x_3 + InG\ y_3 + InB\ z_3$     (EQ:10)

In an embodiment of the present invention, the result of the multiplying step 312 is offset by the value of the input RGB pixel and by the value of the black vertex of the delta 3D cube. In this embodiment, each component value of the output RGB pixel is offset by the corresponding component of the input RGB pixel and the corresponding component of the black vertex of the delta 3D cube. This result is shown below:

$OutR = InR + InR\ x_1 + InG\ y_1 + InB\ z_1 + BlackR$ $OutG = InG + InR\ x_2 + InG\ y_2 + InB\ z_2 + BlackG$ $OutB = InR + InR\ x_3 + InG\ y_3 + InB\ z_3 + BlackB$     (EQ:11)

where BlackR, BlackG and BlackB represents the RGB components of the black vertex of the delta 3D cube, as shown in the first equation of equations (2).

5. Features of the Present Invention

One feature of the present invention is the easy and quick storage of the delta 3D cube. As explained above, the delta 3D cube consists only of a 3×3 matrix wherein each coefficient of the matrix consists of three components. This relatively small amount of information is the only data necessary to transform an input RGB pixel into an output RGB pixel conforming to a color standard. This is an improvement over the large 3D look up table used by the 3D LUT table technique of the prior art described above. The small size of the delta 3D cube of the present invention results in an efficient color transformation.

Another feature of the present invention is the lack of a reduction in the gamut of colors produced by the transformation in the output device. In contrast to the matrix multiplication techniques available in the prior art, the output of the system of the present invention encompasses the entire gamut of colors that can be produced by the input RGB pixels. This feature results in greater accuracy of colors that are produced in the output device by the transformation technique.

Yet another feature of the present invention is the mapping of the input RGB pixel directly into the color space of the color standard. In contrast to the matrix multiplication techniques available in the prior art, the system of the present invention does not map a input RGB pixel into an intermediary color space before mapping the input RGB pixel into the color space of the color standard. This feature results in fewer calculations and less computing time. This leads to greater efficiency in performing the transformation function.

Yet another feature of the present invention is a reduction in computing power necessary for performing the transformation, in contrast to the matrix multiplication techniques available in the prior art. In step 308 of flow 300, the transformation process of the present invention requires the calculation of the simple (and computationally inexpensive) inequalities of equations (6). Next, in step 310, computationally inexpensive subtractions of equations (7) are calculated. Lastly, in step 312, computationally inexpensive additions and multiplications (i.e., matrix multiplication) of equation (10) are calculated. This feature results in fewer calculations and less computing time. This leads to greater efficiency in performing the transformation function.

In another embodiment of the transformation process of the present invention, the 3D cube 400 is divided into eight equal cubes, each of which is then subdivided into six equal tetrahedrons. This embodiment provides an alternative to the transformation process of flow 300 of FIG. 3. In this embodiment, steps 302 and 304 of flow 300 are executed. However, 3D cube 400 is divided into eight equal cubes before step 306. Each of the eight cubes is then subdivided into six equal tetrahedrons, similar to step 306. Subsequently, steps 308 to 314 are executed. In this embodiment, an additional number of calculations are performed (compared to flow 300), however greater accuracy and resolution results.

In yet other embodiments of the transformation process of the present invention, the 3D cube 400 is divided into any number of equal cubes, each of which is then subdivided into six equal tetrahedrons. This is proceeded with steps similar to steps 306 to 314.

Figure 7:
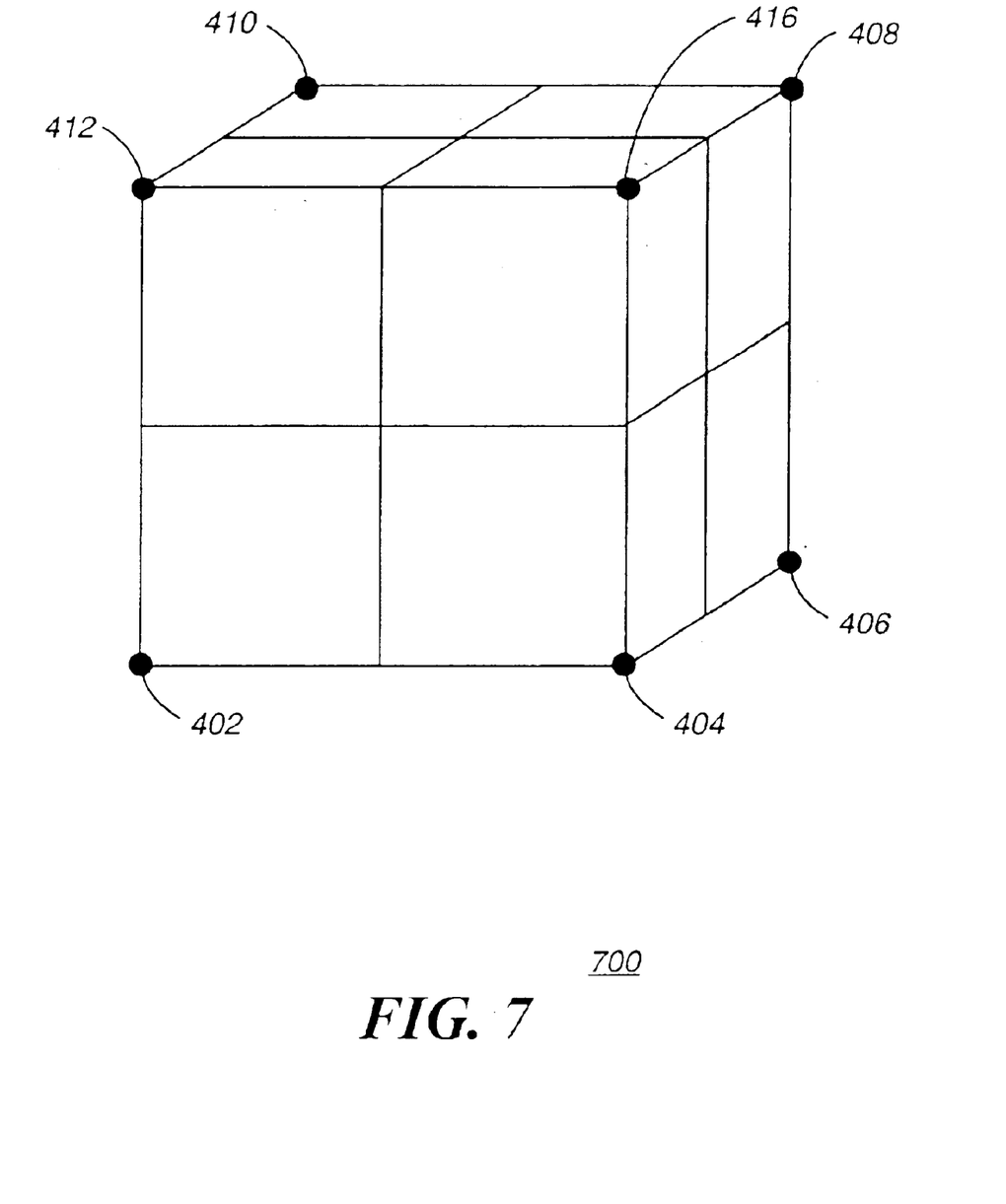
FIG. 7 is an illustration of a divided three-dimensional cube representing a color space, in one embodiment of the present invention.

Yet another feature of the present invention is the decrease in the number of values to be stored, in contrast to the 3D LUT technique of the prior art. The following method of storing the RGB point values representing a 3D cube (as in equations (2)) or a group of 3D cubes requires the storage of a reduced number of values. FIG. 7 is an illustration of a divided three-dimensional cube 700 representing a color space, in an embodiment of the present invention. 3D cube 700 is similar to 3D cube 400 in that eight RGB points (or limit vertices) are used to represent a color space. However, 3D cube 700 shows the 3D cube is divided into eight sub-cubes during the transformation process—whereas 3D cube 400 is not divided into smaller cubes. 3D cube 700 represents the embodiment of the present invention, wherein a 3D cube is divided into eight equal cubes, each of which is then subdivided into six equal tetrahedrons (as described above).

The variable "k" represents the number of points necessary to represent a 3D cube in one of the three dimensions. Referring to 3D cube 400, it can be shown that any dimension (i.e., any line consisting of an edge of the 3D cube) can be minimally defined by two points—the two endpoints of any edge. Referring to 3D cube 700 (which has been divided into eight sub-cubes), it can be shown that any dimension (i.e., any line consisting of an edge of the 3D cube) can be minimally defined by three points—the two endpoints of any edge, plus an additional midpoint of the edge, at the separation between two sub-cubes. Thus, for one 3D cube, two points are necessary to represent the 3D cube in one dimension. For a 3D cube that has been subdivided into eight equal cubes, three points are necessary to represent the subdivided 3D cube in one dimension. Further, it is shown that "k" is proportional to the number of vertices for any 3D cube (subdivided or non-subdivided):

$$\text{number of vertices} = k^3 \qquad (EQ:12)$$

Moreover, it is shown that "k" is proportional to the number of (sub) cubes represented:

$$\text{number of (sub) cubes} = (k-1)^3. \qquad (EQ:13)$$

For example, in an embodiment where a non-divided 3D cube is used for the transformation, k=2. Therefore, the number of vertices for that cube is $(2)^3=8$ and the number of cubes represented is $(2-1)^3=1$. Further, for an embodiment where one 3D cube divided into eight sub-cubes is used for the transformation, k=3. Therefore, the number of vertices for that divided cube is $(3)^3=27$ and the number of cubes represented is $(3-1)^3=8$. Finally, for an embodiment where one 3D cube divided into sixty four sub-cubes is used for the transformation, k=5. Therefore, the number of vertices for that subdivided cube is $(5)^3=125$ and the number of cubes represented is $(5-1)^3=64$. This process can be used for any number of subdivisions of the 3D cube.

The prior art shows that a 3D cube is typically stored by storing the vertices of the 3D cube. For a non-divided 3D cube, the number of vertices stored is eight. However, for a divided 3D cube, the number of vertices stored is the number of sub-cubes multiplied by eight, thus:

$$\text{number of vertices stored} = 8*(k-1)^3 \qquad (EQ:14)$$

In contrast, in the present invention, the number of vertices stored is given by equation (12). Thus:

$$\text{number of vertices stored} = k^3 \qquad (EQ:15)$$

Comparing equation (14) to equation (15), it is shown that for values of k>2, the resulting number of vertices is greater in equation (14) than in equation (15). Therefore, it is shown that method of the present invention for storing the vertex values representing a divided 3D cube requires the storage of a reduced number of values over the method of the prior art.

Yet another feature of the present invention is the more efficient retrieval of stored values, in contrast to the prior art. The following method of retrieving requires a reduced number of bits. Typically, the representation of N number of values (wherein N is a base ten number) requires a number of bits x, such that x is defined by:

$$2^{x-1} < N < 2^x \qquad (EQ:16)$$

In an embodiment of the present invention wherein the 3D cube is divided into eight sub-cubes, the determination of the location of the input RGB pixel within the divided cube conventionally requires four bits (referring to equation 16). In an embodiment of the present invention, the number of bits necessary for this determination is reduced. Using the most significant bit of each of the three components of the input RGB pixel, the location of the input RGB pixel within the 3D cube can be determined. The first bit is used to determine whether the pixel is located within the top four sub-cubes or the bottom four sub-cubes. The second bit is used to determine whether the pixel is located within the right two sub-cubes, or the left two sub-cubes, of the remaining four sub-cubes. The third bit is used to determine whether the pixel is located within the front sub-cube, or the back sub-cube, of the remaining two sub-cubes. In this fashion, a reduced number of bits (three bits as opposed to four bits) is used to retrieve the desired information. This retrieval method is also used upon retrieval of the delta cube in step 304 of FIG. 3.

6. Exemplary Implementations

Figure 6:
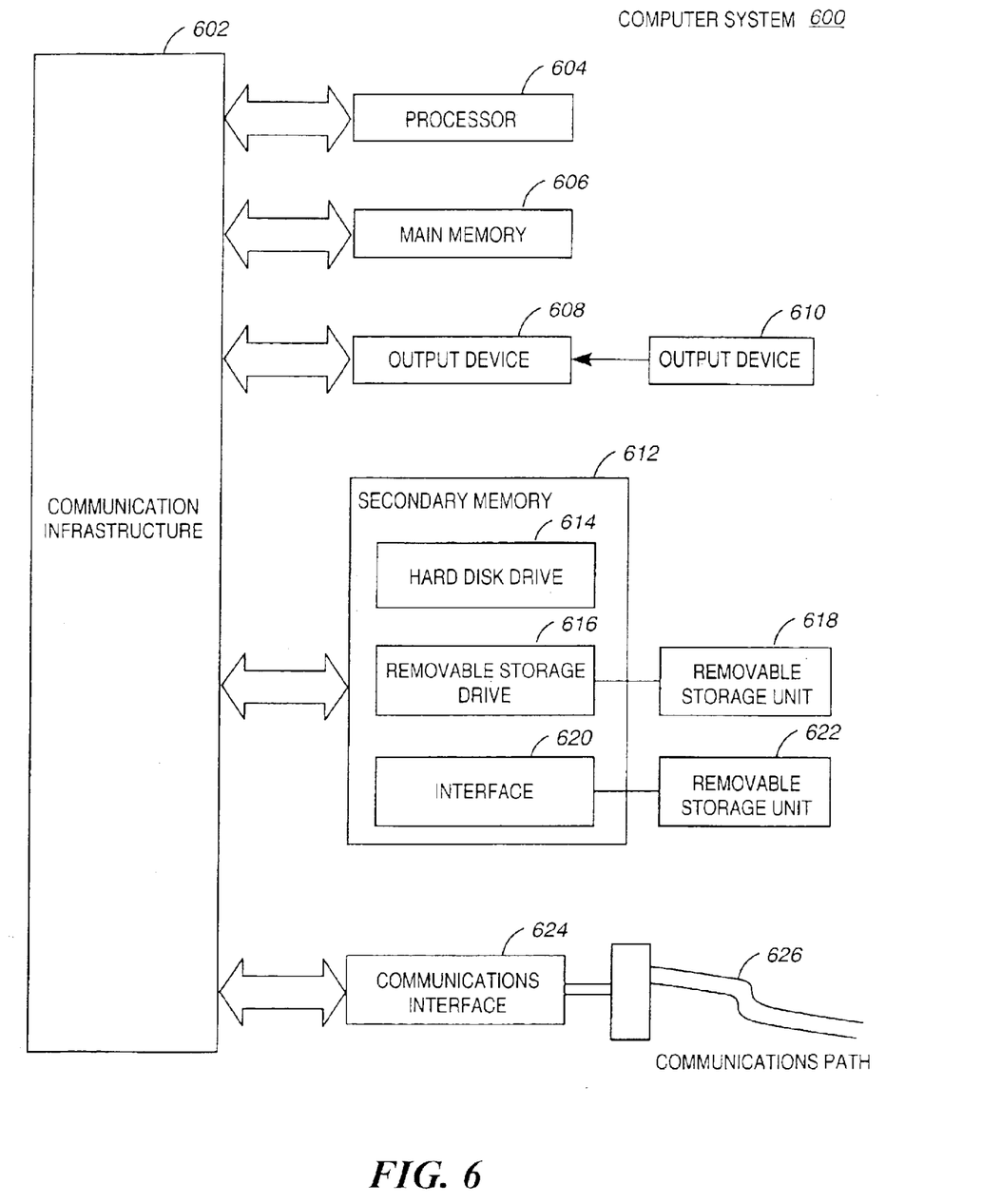
FIG. 6 is a block diagram of an exemplary computer system useful for implementing the present invention.

The present invention (i.e., system 100, flows 200, 300 or any part thereof) is implemented using hardware, software or a combination thereof and is implemented in one or more computer systems or other processing systems. An example of a computer system 600 is shown in FIG. 6. The computer system 600 represents any single or multi-processor computer. In conjunction, single-threaded and multi-threaded applications are used. Unified or distributed memory systems are used.

In one example, the present invention is implemented in a multi-platform (platform independent) programming language such as Java, programming language/structured query language (PL/SQL), hyper-text mark-up language (HTML), practical extraction report language (PERL), Flash programming language, common gateway interface/structured query language (CGI/SQL) or the like. Java-enabled and JavaScript-enabled browsers are used, such as, Netscape, HotJava, and Microsoft Explorer browsers. Active content web pages can be used. Such active content web pages include Java applets or ActiveX controls, or any other active content technology developed now or in the future. The present invention, however, is not intended to be limited to Java, JavaScript, or their enabled browsers, and are implemented in any programming language and browser, developed now or in the future, as would be apparent to a person skilled in the relevant art(s) given this description.

In another example, the present invention is implemented using a high-level programming language (e.g., C++) and applications written for the Microsoft Windows NT or SUN OS environments. It will be apparent to persons skilled in the relevant art(s) how to implement the invention in alternative embodiments from the teachings herein.

Computer system 600 includes one or more processors, such as processor 604. One or more processors 604 execute software implementing the routines of the invention, described above. Each processor 604 is connected to a communication infrastructure 602 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 600 includes an output device interface 608 that forwards graphics, text, and other data from the communication infrastructure 602 (or from a frame buffer not shown) for display on the output device 610.

Computer system 600 also includes a main memory 606, preferably random access memory (RAM), and also includes a secondary memory 612. The secondary memory 612 includes, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a well known manner. Removable storage unit 618 represents a floppy disk, magnetic tape, optical disk, etc., which is read by and written to by removable storage drive 616. As will be appreciated, the removable storage unit 618 includes a computer usable storage medium having stored therein computer software and/or data.

In alternative embodiments, secondary memory 612 includes other similar means for allowing computer programs or other instructions to be loaded into computer system 600. Such means include, for example, a removable storage unit 622 and an interface 620. Examples include a program cartridge and cartridge interface (such as that found in video game console devices), a removable memory chip (such as an EPROM, or PROM) and associated socket, and other removable storage units 622 and interfaces 620 which allow software and data to be transferred from the removable storage unit 622 to computer system 600.

Computer system 600 also includes a communications interface 624. Communications interface 624 allows software and data to be transferred between computer system 600 and external devices via communications path 626. Examples of communications interface 624 include a modem, a network interface (such as Ethernet card), a communications port, interfaces described above, etc. Software and data transferred via communications interface 624 are in the form of signals which are electronic, electromagnetic, optical or other signals capable of being received by communications interface 624, via communications path 626. Note that communications interface 624 provides a means by which computer system 600 interfaces to a network such as the Internet.

The present invention is implemented using software running (that is, executing) in an environment similar to that described above. In this document, the term "computer program product" is used to generally refer to removable storage unit 618, a hard disk installed in hard disk drive 614, or a carrier wave carrying software over a communication path 626 (wireless link or cable) to communication interface 624. A computer useable medium includes magnetic media, optical media, or other recordable media, or media that transmits a carrier wave or other signal. These computer program products are means for providing software to computer system 600.

Computer programs (also called computer control logic) are stored in main memory 606 and/or secondary memory 612. Computer programs are also received via communications interface 624. Such computer programs, when executed, enable the computer system 600 to perform the features of the present invention as discussed herein. In particular, the computer programs, when executed, enable the processor 604 to perform features of the present invention. Accordingly, such computer programs represent controllers of the computer system 600.

The present invention is implemented as control logic in software, firmware, hardware or any combination thereof. In an embodiment where the invention is implemented using software, the software is stored in a computer program product and loaded into computer system 600 using removable storage drive 606, hard disk drive 614, or interface 620. Alternatively, the computer program product is downloaded to computer system 600 over communications path 626. The control logic (software), when executed by the one or more processors 604, causes the processor(s) 604 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein. In one embodiment, the present invention is implemented in the ST Microelectronics ADE 3250 integrated circuit. This integrated circuit is an all-inclusive display engine for high quality dual input IQPanel applications with the additional option for video (digital CCIR656 YUV) input. The ADE 3250 integrates a programmable LCD timing controller for a flexible IQPanel or smart panel design.

7. Conclusion

While various embodiments of the present invention have been described above, it should be understood that they have been presented by way of example, and not limitation. It will be apparent to persons skilled in the relevant art(s) that various changes in form and detail are made therein without departing from the spirit and scope of the invention. Thus the present invention should not be limited by any of the above-described exemplary embodiments, but should be defined only in accordance with the following claims and their equivalents.

What is claimed is:

1. A method for transforming color information for conformance with a color standard, comprising the steps of:

storing a plurality of RGB color points representing each vertex of at least one three dimensional cube, wherein each of the RGB color points represents a difference between a capacity of an output device and a selected color standard;

dividing the three dimensional cube into six tetrahedrons;

determining which of a first tetrahedron, a second tetrahedron, a third tetrahedron, a fourth tetrahedron, a fifth tetrahedron, and a six tetrahedron of the six tetrahedrons corresponds to an input RGB pixel with an R, G and B component by determining which of the following six sets of inequalities is true:

$InR \geq InG$; $InR \geq InB$; $InG \geq InB$, for the first tetrahedron $InR \geq InG$; $InR \geq InB$; $InG \leq InB$, for the second tetrahedron $InR \leq InG$; $InR \geq InB$; $InG \geq InB$, for the third tetrahedron $InR \leq InG$; $InR \leq InB$; $InG \geq InB$, for the fourth tetrahedron $InR \geq InG$; $InR \leq InB$; $InG \leq InB$, for the fifth tetrahedron $InR \leq InG$; $InR \leq InB$; $InG \leq InB$, for the sixth tetrahedron wherein InR is the R component of the input RGB pixel, InG is the G component and InB is the B component;

calculating a 3×3 matrix based on each vertex of one of the six tetrahedrons corresponding to the input RGB pixel; and multiplying the 3×3 matrix by the components of the input RGB pixel, wherein an output RGB pixel conforming to the selected color standard is calculated.

2. The method of claim 1, wherein the step of storing includes storing eight RGB color points representing each limit vertex of the three dimensional cube, wherein the eight RGB color points represent the following colors: red, yellow, white, magenta, blue, black, green and cyan.

3. The method of claim 2, wherein the step of dividing includes:

dividing the three dimensional cube into six tetrahedrons, wherein each of the six tetrahedrons is defined by four limit vertices of the three dimensional cube.

4. The method of claim 3, wherein the step of dividing includes six tetrahedrons defined by the following limit vertices of:

white, red, yellow, black;

white, yellow, green, black;

white, green, cyan, black;

white, cyan, blue, black;

white, magenta, blue, black; and white, magenta, red, black.

5. The method of claim 4, wherein the step of calculating includes:

calculating a 3×3 matrix based on the following definitions:

$x_1$=RedR−BlackR; $y_1$=RedG−BlackG; $z_1$=RedB−BlackB $x_2$=YellowR−RedR; $y_2$=YellowG−RedG; $z_2$=YellowB−RedB $x_3$=WhiteR−YellowR; $y_3$=WhiteG−YellowG; $z_3$=WhiteB−YellowB $x_1$=RedR−BlackR; $y_1$=RedG−BlackG; $z_1$=RedB−BlackB $x_2$=WhiteR−MagentaR; $y_2$=WhiteG−MagentaG; $z_2$=WhiteB−MagentaB $x_3$=MagentaR−RedR; $y_3$=MagentaG−RedG; $z_3$=MagentaB−RedB $x_1$=YellowR−GreenR; $y_1$=YellowG−GreenG; $z_1$=YellowB−GreenB $x_2$=GreenR−BlackR; $y_2$=GreenG−BlackG; $z_2$=GreenB−BlackB $x_3$=WhiteR−YellowR; $y_3$=WhiteG−YellowG; $z_3$=WhiteB−YellowB $x_1$=WhiteR−CyanR; $y_1$=WhiteG−CyanG; $z_1$=WhiteB−CyanB $x_2$=GreenR−BlackR; $y_2$=GreenG−BlackG; $z_2$=GreenB−BlackB $x_3$=CyanR−GreenR; $y_3$=CyanG−GreenG; $z_3$=CyanB−GreenB $x_1$=MagentaR−BlueR; $y_1$=MagentaG−BlueG; $z_1$=MagentaB−BlueB $x_2$=WhiteR−MagentaR; $y_2$=WhiteG−MagentaG; $z_2$=WhiteB−MagentaB $x_3$=BlueR−BlackR; $y_3$=BlueG−BlackG; $z_3$=BlueB−BlackB $x_1$=WhiteR−CyanR; $y_1$=WhiteG−CyanG; $z_1$=WhiteB−CyanB $x_2$=CyanR−BlueR; $y_2$=CyanG−BlueG; $z_2$=CyanB−BlueB $x_3$=BlueR−BlackR; $y_3$=BlueG−BlackG; $z_3$=BlueB−BlackB wherein the first set of equalities corresponds to the first tetrahedron of the six tetrahedrons, the second set of equalities corresponds to the second tetrahedron, the third set of equalities corresponds to the third tetrahedron, the fourth set of equalities corresponds to the fourth tetrahedron, the fifth set of equalities corresponds to the fifth tetrahedron, and the sixth set of equalities corresponds to the sixth tetrahedron.

6. The method of claim 2, wherein the step of multiplying includes:

multiplying the 3×3 matrix by the components of the input RGB pixel according to the formula:

$$\begin{pmatrix} x_1 & y_1 & z_1 \\ x_2 & y_2 & z_2 \\ x_3 & y_3 & z_3 \end{pmatrix} \begin{pmatrix} R \\ G \\ B \end{pmatrix}$$

wherein $x_1$, $y_1$, $z_1$, $x_2$, $y_2$, $z_2$, $x_3$, $y_3$ and $z_3$ are the coefficients of the 3×3 matrix and R, G and B represent the components of the input RGB pixel.

7. The method of claim 6, wherein the step of multiplying further includes:

offsetting a result of the step of multiplying by the components of the input RGB pixel and by the components of the black limit vertex of the three dimensional cube.

8. A computer readable medium including computer instructions for transforming color information into a standard color space, the computer instructions comprising instructions for:

storing a plurality of RGB color points representing each vertex of at least one three dimensional cube, wherein each of the RGB color points represents a difference between a capacity of an output device and a selected color standard;

dividing the three dimensional cube into six tetrahedrons;

determining which of a first tetrahedron, a second tetrahedron, a third tetrahedron, a fourth tetrahedron, a fifth tetrahedron, and a six tetrahedron of the six tetrahedrons corresponds to an input RGB pixel with an R, G and B component by determining which of the following six sets of inequalities is true:

$InR \geq InG$; $InR \geq InB$; $InG \geq InB$, for the first tetrahedron
$InR \geq InG$; $InR \geq InB$; $InG \leq InB$, for the second tetrahedron
$InR \leq InG$; $InR \geq InB$; $InG \geq InB$, for the third tetrahedron
$InR \leq InG$; $InR \leq InB$; $InG \geq InB$, for the fourth tetrahedron
$InR \geq InG$; $InR \leq InB$; $InG \leq InB$, for the fifth tetrahedron
$InR \leq InG$; $InR \leq InB$; $InG \leq InB$, for the sixth tetrahedron wherein InR is the R component of the input RGB pixel, InG is the G component and InB is the B component;

calculating a 3×3 matrix based on each vertex of one of the six tetrahedrons corresponding to the input RGB pixel; and multiplying the 3×3 matrix by the components of the input RGB pixel, wherein an output RGB pixel conforming to the selected color standard is calculated.

9. The computer readable medium of claim 8, wherein the instructions for storing include storing eight RGB color points representing each limit vertex of the three dimensional cube, wherein the eight RGB color points represent the following colors: red, yellow, white, magenta, blue, black, green and cyan.

10. The computer readable medium of claim 9, wherein the instructions for dividing include:

dividing the three dimensional cube into six tetrahedrons, wherein each of the six tetrahedrons is defined by four limit vertices of the three dimensional cube.

11. The computer readable medium of claim 10, wherein the instructions for dividing include six tetrahedrons defined by the following limit vertices of:

white, red, yellow, black;
white, yellow, green, black;
white, green, cyan, black;
white, cyan, blue, black;
white, magenta, blue, black; and
white, magenta, red, black.

12. The computer readable medium of claim 8, wherein the instructions for calculating include:

calculating a 3×3 matrix based on the following definitions:

$x_1$=RedR−BlackR; $y_1$=RedG−BlackG; $z_1$=RedB−BlackB
$x_2$=YellowR−RedR; $y_2$=YellowG−RedG; $z_2$=YellowB−RedB
$x_3$=WhiteR−YellowR; $y_3$=WhiteG−YellowG; $z_3$=WhiteB−YellowB $x_1$=RedR−BlackR; $y_1$=RedG−BlackG; $z_1$=RedB−BlackB
$x_2$=WhiteR−MagentaR; $y_2$=WhiteG−MagentaG; $z_2$=WhiteB−MagentaB
$x_3$=MagentaR−RedR; $y_3$=MagentaG−RedG; $z_3$=MagentaB−RedB $x_1$=YellowR−GreenR; $y_1$=YellowG−GreenG; $z_1$=YellowB−GreenB
$x_2$=GreenR−BlackR; $y_2$=GreenG−BlackG; $z_2$=GreenB−BlackB
$x_3$=WhiteR−YellowR; $y_3$=WhiteG−YellowG; $z_3$=WhiteB−YellowB $x_1$=WhiteR−CyanR; $y_1$=WhiteG−CyanG; $z_1$=WhiteB−CyanB
$x_2$=GreenR−BlackR; $y_2$=GreenG−BlackG; $z_2$=GreenB−BlackB
$x_3$=CyanR−GreenR; $y_3$=CyanG−GreenG; $z_3$=CyanB−GreenB $x_1$=MagentaR−BlueR; $y_1$=MagentaG−BlueG; $z_1$=MagentaB−BlueB
$x_2$=WhiteR−MagentaR; $y_2$=WhiteG−MagentaG; $z_2$=WhiteB−MagentaB
$x_3$=BlueR−BlackR; $y_3$=BlueG−BlackG; $z_3$=BlueB−BlackB $x_1$=WhiteR−CyanR; $y_1$=WhiteG−CyanG; $z_1$=WhiteB−CyanB
$x_2$=CyanR−BlueR; $y_2$=CyanG−BlueG; $z_2$=CyanB−BlueB
$x_3$=BlueR−BlackR; $y_3$=BlueG−BlackG; $z_3$=BlueB−BlackB wherein the first set of equalities corresponds to the first tetrahedron of the six tetrahedrons, the second set of equalities corresponds to the second tetrahedron, the third set of equalities corresponds to the third tetrahedron, the fourth set of equalities corresponds to the fourth tetrahedron, the fifth set of equalities corresponds to the fifth tetrahedron, and the sixth set of equalities corresponds to the sixth tetrahedron.

13. The computer readable medium of claim 9, wherein the instructions for multiplying include:

multiplying the 3×3 matrix by the components of the input RGB pixel according to the formula:

$$\begin{pmatrix} x_1 & y_1 & z_1 \\ x_2 & y_2 & z_2 \\ x_3 & y_3 & z_3 \end{pmatrix} \begin{pmatrix} R \\ G \\ B \end{pmatrix}$$

wherein $x_1$, $y_1$, $z_1$, $x_2$, $y_2$, $z_2$, $x_3$, $y_3$ and $z_3$ are the coefficients of the 3×3 matrix and R, G and B represent the components of the input RGB pixel.

14. The computer readable medium of claim 13, wherein the instructions for multiplying further include:

offsetting a result of the instructions for multiplying by the components of the input RGB pixel and by the components of the black limit vertex of the three dimensional cube.

15. A system for transforming color information into a standard color space, comprising:

means for storing a plurality of RGB color points representing each vertex of at least one three dimensional cube, wherein each of the RGB color points represents a difference between a capacity of an output device and a selected color standard;

means for dividing the three dimensional cube into six tetrahedrons;

means for determining which of a first tetrahedron, a second tetrahedron, a third tetrahedron, a fourth tetrahedron, a fifth tetrahedron, and a six tetrahedron of the six tetrahedrons corresponds to an input RGB pixel with an R, G and B component by determining which of the following six sets of inequalities is true:

InR≧InG; InR≧InB; InG≧InB, for the first tetrahedron

InR≧InG; InR≧InB; InG≦InB, for the second tetrahedron

InR≦InG; InR≧InB; InG≧InB, for the third tetrahedron

InR≦InG; InR≦InB; InG≧InB, for the fourth tetrahedron

InR≧InG; InR≦InB; InG≦InB, for the fifth tetrahedron

InR≦InG; InR≦InB; InG≦InB, for the sixth tetrahedron wherein InR is the R component of the input RGB pixel, InG is the G component and InB is the B component;

means for calculating a 3×3 matrix based on each vertex of one of the six tetrahedrons corresponding to the input RGB pixel; and means for multiplying the 3×3 matrix by the components of the input RGB pixel, wherein an output RGB pixel conforming to the selected color standard is calculated.

16. The system of claim 15, wherein the means for storing includes storing eight RGB color points representing each limit vertex of the three dimensional cube, wherein the eight RGB color points represent the following colors: red, yellow, white, magenta, blue, black, green and cyan.

17. The system of claim 16, wherein the means for dividing includes:

means for dividing the three dimensional cube into six tetrahedrons, wherein each of the six tetrahedrons is defined by four limit vertices of the three dimensional cube.

18. The system of claim 17, wherein the means for dividing includes six tetrahedrons defined by the following limit vertices of:

white, red, yellow, black;

white, yellow, green, black;

white, green, cyan, black;

white, cyan, blue, black;

white, magenta, blue, black; and white, magenta, red, black.

19. The system of claim 18, wherein the means for calculating includes:

means for calculating a 3×3 matrix based on the following definitions:

wherein the first set of equalities corresponds to the first tetrahedron of the six tetrahedrons, the second set of equalities corresponds to the second tetrahedron, the third set of equalities corresponds to the third tetrahedron, the fourth set of equalities corresponds to the fourth tetrahedron, the fifth set of equalities corresponds to the fifth tetrahedron, and the sixth set of equalities corresponds to the sixth tetrahedron.

20. The system of claim 16, wherein the means for multiplying includes:

means for multiplying the 3×3 matrix by the components of the input RGB pixel according to the formula:

$$\begin{pmatrix} x_1 & y_1 & z_1 \\ x_2 & y_2 & z_2 \\ x_3 & y_3 & z_3 \end{pmatrix} \begin{pmatrix} R \\ G \\ B \end{pmatrix}$$

wherein $x_1$, $y_1$, $z_1$, $x_2$, $y_2$, $z_2$, $x_3$, $y_3$ and $z_3$ are the coefficients of the 3×3 matrix and R, G and B represent the components of the input RGB pixel.

21. A system for transforming color information into a standard color space, comprising:

an interface to storage for storing a plurality of RGB color points representing each vertex of at least one three dimensional cube, wherein each of the RGB color points represents a difference between a capacity of an output device and a selected color standard;

a processor configured to divide the three dimensional cube into six tetrahedrons;

a processor configured to determine which of the six tetrahedrons corresponds to an input RGB pixel with an R, G and B component by determining which of the following six sets of inequalities is true:

InR≧InG; InR≧InB; InG≧InB

InR≧InG; InR≧InB; InG≦InB

InR≦InG; InR≧InB; InG≧InB

InR≦InG; InR≦InB; InG≧InB

InR≧InG; InR≦InB; InG≦InB

InR≦InG; InR≦InB; InG≦InB wherein InR is the R component of the input RGB pixel, InG is the G component and InB is the B component and wherein the first set of inequalities corresponds to the first tetrahedron of the six tetrahedrons, the second set of inequalities corresponds to the second tetrahedron, the third set of

| | | |
|---|---|---|
| $x_1$ = RedR − BlackR; | $y_1$ = RedG − BlackG; | $z_1$ = RedB − BlackB; |
| $x_2$ = YellowR − RedR; | $y_2$ = YellowG − RedG; | $z_2$ = YellowB − RedB; |
| $x_3$ = WhiteR − YellowR; | $y_3$ = WhiteG − YellowG; | $z_3$ = WhiteB − YellowB; |
| $x_1$ = RedR − BlackR; | $y_1$ = RedG − BlackG; | $z_1$ = RedB − BlackB; |
| $x_2$ = WhiteR − MagentaR; | $y_2$ = WhiteG − MagentaG; | $z_2$ = WhiteB − MagentaB; |
| $x_3$ = MagentaR − RedR; | $y_3$ = MagentaG − RedG; | $z_3$ = MagentaB − RedB; |
| $x_1$ = YellowR − GreenR; | $y_1$ = YellowG − GreenG; | $z_1$ = YellowB − GreenB; |
| $x_2$ = GreenR − BlackR; | $y_2$ = GreenG − BlackG; | $z_2$ = GreenB − BlackB; |
| $x_3$ = WhiteR − YellowR; | $y_3$ = WhiteG − YellowG; | $z_3$ = WhiteB − YellowB; |
| $x_1$ = WhiteR − CyanR; | $y_1$ = WhiteG − CyanG; | $z_1$ = WhiteB − CyanB; |
| $x_2$ = GreenR − BlackR; | $y_2$ = GreenG − BlackG; | $z_2$ = GreenB − BlackB; |
| $x_3$ = CyanR − GreenR; | $y_3$ = CyanG − GreenG; | $z_3$ = CyanB − GreenB; |
| $x_1$ = MagentaR − BlueR; | $y_1$ = MagentaG − BlueG; | $z_1$ = MagentaB − BlueB; |
| $x_2$ = WhiteR − MagentaR; | $y_2$ = WhiteG − MagentaG; | $z_2$ = WhiteB − MagentaB; |
| $x_3$ = BlueR − BlackR; | $y_3$ = BlueG − BlackG; | $z_3$ = BlueB − BlackB; |
| $x_1$ = WhiteR − CyanR; | $y_1$ = WhiteG − CyanG; | $z_1$ = WhiteB − CyanB; |
| $x_2$ = CyanR − BlueR; | $y_2$ = CyanG − BlueG; | $z_2$ = CyanB − BlueB; |
| $x_3$ = BlueR − BlackR; | $y_3$ = BlueG − BlackG; | $z_3$ = BlueB − BlackB; | inequalities corresponds to the third tetrahedron, the fourth set of inequalities corresponds to the fourth tetrahedron, the fifth set of inequalities corresponds to the fifth tetrahedron, and the sixth set of inequalities corresponds to the sixth tetrahedron;

a processor configured to calculate a 3×3 matrix based on each vertex of a tetrahedron corresponding to the input RGB pixel; and a processor configured to multiply the 3×3 matrix by the components of the input RGB pixel, wherein an output RGB pixel conforming to the selected color standard is calculated.

22. The system of claim 21, wherein the system is implemented in the ST Microelectronics ADE 3250 integrated circuit.

* * * * *